US010250608B2

(12) United States Patent
Chan et al.

(10) Patent No.: US 10,250,608 B2
(45) Date of Patent: Apr. 2, 2019

(54) METHODS AND SYSTEMS FOR MANAGING A NETWORK NODE THROUGH A SERVER

(71) Applicant: Pismo Labs Technology Limited, Hong Kong (HK)

(72) Inventors: Ho Ming Chan, Quarry Bay (HK); Kit Wai Chau, Kowloon (HK); Kenneth Kai Kut Yip, Kowloon (HK)

(73) Assignee: PISMO LABS TECHNOLOGY LIMITED, Hong Kong (HK)

(*) Notice: Subject to any disclaimer, the term of this patent is extended or adjusted under 35 U.S.C. 154(b) by 0 days.

(21) Appl. No.: 15/644,851

(22) Filed: Jul. 10, 2017

(65) Prior Publication Data
US 2017/0310678 A1 Oct. 26, 2017

Related U.S. Application Data

(63) Continuation of application No. 14/410,097, filed on Dec. 21, 2014, now Pat. No. 9,705,882.

(51) Int. Cl.
*H04L 29/06* (2006.01)
*H04L 12/24* (2006.01)
(52) U.S. Cl.
CPC .............. *H04L 63/10* (2013.01); *H04L 41/28* (2013.01); *H04L 63/0428* (2013.01); *H04L 63/08* (2013.01)
(58) Field of Classification Search
CPC ..... H04L 63/10; H04L 63/0428; H04L 63/08; H04L 41/28
See application file for complete search history.

(56) References Cited

U.S. PATENT DOCUMENTS

| 8,010,642 | B2* | 8/2011 | Gonzalez Lopez | H04L 41/28 709/223 |
| 8,341,708 | B1* | 12/2012 | Eatough | G06F 21/305 713/156 |
| 8,745,219 | B2* | 6/2014 | Carley | H04L 63/08 709/223 |
| 8,812,859 | B2 | 8/2014 | Yeap et al. | |
| 2004/0139167 | A1 | 7/2004 | Edsall et al. | |
| 2004/0172396 | A1* | 9/2004 | Vanska | G07C 9/00309 |
| 2005/0223014 | A1 | 10/2005 | Sharma et al. | |

(Continued)

FOREIGN PATENT DOCUMENTS

CN 101341467 A 1/2009
CN 103188269 A 7/2013

OTHER PUBLICATIONS

International Search Report in International Application No. PCT/IB2014/062192, dated Mar. 17, 2015.

(Continued)

*Primary Examiner* — Sarah Su
(74) *Attorney, Agent, or Firm* — Hershkovitz & Associates, PLLC; Abe Hershkovitz

(57) ABSTRACT

The present invention discloses methods and systems for managing a node through a management server. The management server verifies whether a management confirmation has been received and allows a second user group to manage the node if the management confirmation is received. If the management confirmation is not received by the management server, the second user group is not allowed to manage the node through the management server.

18 Claims, 11 Drawing Sheets

(56) References Cited

U.S. PATENT DOCUMENTS

| | | |
|---|---|---|
| 2005/0226248 A1 | 10/2005 | Modi et al. |
| 2007/0143291 A1 | 6/2007 | Browne |
| 2007/0203946 A1* | 8/2007 | Maeshima ............. G11B 17/08 |
| 2007/0226538 A1 | 9/2007 | Ban et al. |
| 2007/0288623 A1* | 12/2007 | Kato ....................... G06F 21/33 |
| | | 709/223 |
| 2008/0065680 A1 | 3/2008 | Moon |
| 2008/0083038 A1 | 4/2008 | Fujii et al. |
| 2008/0209213 A1 | 8/2008 | Astrand et al. |
| 2009/0024853 A1* | 1/2009 | Yeap ................... H04L 63/0428 |
| | | 713/182 |
| 2009/0235345 A1 | 9/2009 | Oikawa et al. |
| 2009/0264070 A1* | 10/2009 | Lim ................... G06Q 30/0261 |
| | | 455/41.2 |
| 2009/0320125 A1* | 12/2009 | Pleasant, Jr. ............ G06F 21/31 |
| | | 726/17 |
| 2010/0153532 A1 | 6/2010 | Ozawa et al. |
| 2010/0192234 A1 | 7/2010 | Sugimoto et al. |
| 2011/0154470 A1* | 6/2011 | Grimes ............... H04L 63/0263 |
| | | 726/11 |
| 2011/0314517 A1 | 12/2011 | Yamato et al. |
| 2012/0131502 A1 | 5/2012 | Bock et al. |
| 2013/0067544 A1* | 3/2013 | Kwark .................. H04W 12/08 |
| | | 726/4 |
| 2013/0088325 A1 | 4/2013 | Choi |
| 2013/0174227 A1 | 7/2013 | Araki et al. |
| 2013/0185446 A1 | 7/2013 | Zeng et al. |
| 2014/0019352 A1* | 1/2014 | Shrivastava ....... G06Q 20/3674 |
| | | 705/41 |
| 2014/0059656 A1 | 2/2014 | Maeda et al. |
| 2014/0090028 A1 | 3/2014 | Matsugashita |
| 2014/0113593 A1* | 4/2014 | Zhou ....................... H04L 63/20 |
| | | 455/411 |
| 2014/0114497 A1* | 4/2014 | Miyake ..................... H04L 9/32 |
| | | 701/1 |
| 2014/0137205 A1 | 5/2014 | Brown et al. |
| 2014/0304837 A1 | 10/2014 | Mogaki |
| 2014/0359750 A1* | 12/2014 | Adams .................... G06F 21/74 |
| | | 726/16 |
| 2015/0103991 A1* | 4/2015 | Albert .................... H04M 3/56 |
| | | 379/202.01 |
| 2015/0106881 A1 | 4/2015 | Wharton et al. |
| 2016/0080322 A1* | 3/2016 | Prisser ................. H04L 63/102 |
| | | 726/1 |
| 2016/0134590 A1 | 5/2016 | Chan et al. |
| 2017/0237572 A1* | 8/2017 | Shi ...................... H04L 63/0815 |
| | | 713/156 |

OTHER PUBLICATIONS

Written Opinion of the international Searching Authority in International Application No. PCT/IB2014/062192, dated Mar. 17, 2015.
English language Abstract of CN 101341467 A (Jan. 7, 2009).
English language Abstract of CN 103188269 A (Jul. 3, 2013).

* cited by examiner

METHODS AND SYSTEMS FOR MANAGING A NETWORK NODE THROUGH A SERVER

RELATED APPLICATION

The present application is a Non-provisional Continuation Application which claims the benefits of and is based on Non-provisional application Ser. No. 14/410,097 titled "METHODS AND SYSTEMS FOR MANAGING A NODE" filed on Dec. 21, 2014.

BACKGROUND

It is common that in order to configure a node, an administrator of the node needs to log into the node to perform the configuration. In order to configure the node, the administrator may need to be in the same geographical location or in close proximity of the node. In some scenarios, when the node is a remote node, it is possible to manage the node through a server. A user who manages the node through a server may or may not be the administrator.

The present invention discloses a method by which an administrator may allow a user or not allow a user to manage the node through a server.

TECHNICAL FIELD

The present invention relates in general to the field of computer networks. More particularly, the present invention relates to methods and systems for allowing a user group to manage a node through a management server.

DISCLOSURE OF INVENTION

Summary

The present invention discloses methods and systems for managing a node through a management server. The management server verifies whether a management confirmation has been received and allows a second user group to manage the node if the management confirmation is received. If the management confirmation is not received by the management server, the second user group is not allowed to manage the node through the management server. The management confirmation may be received from the node.

According to one of the embodiments of the present invention, the node is capable of being managed by a first user group through the management server before the management server receives the management confirmation from the node. After the management server receives the management confirmation from the node, the node is no longer capable of being managed by the first user group through the management server.

According to one of the embodiments of the present invention, before verifying whether the management confirmation has been received, the management server receives a management request from the second user group to manage the node. After receiving the management request, the management server sends a confirmation request to the node.

According to one of the embodiments of the present invention, the management confirmation is encrypted. The management server is capable of decrypting the management confirmation.

According to one of the embodiments of the present invention, the management confirmation comprises user group identity information. The management confirmation may also comprise user identity information. The node may send the user group identity information and user identity information of user groups and user(s) who may be allowed to manage the node through the management server, and the user group identity information and user identity information is comprised in the management confirmation.

According to one of the embodiments of the present invention, the management confirmation comprises a code. The node may provide a user or a user group with the code, and also send the code to the management server in the management confirmation. The management server may allow the user or user group to manage the node through the management server if the user or user group can provide the code to the management server.

According to one of the embodiments of the present invention, the node receives a confirmation request from the management server. The confirmation request is received after the second user group has sent a management request to manage the node through the management server. After receiving the confirmation request, the node displays a confirmation waiting message to an administrator of the node. The confirmation waiting message may be displayed at an administration user interface. The node then verifies whether a confirmation message is received from the administrator. If a confirmation message is received, the node sends a management confirmation to the management server and allows the second user group to manage the node through the management server.

According to one of the embodiments of the present invention, the confirmation request is encrypted. The node can decrypt the confirmation request.

According to one of the embodiments of the present invention, the identity of the administrator is verified by the node before the confirmation waiting message is displayed to the administrator.

DETAILED DESCRIPTION

Figure 1:
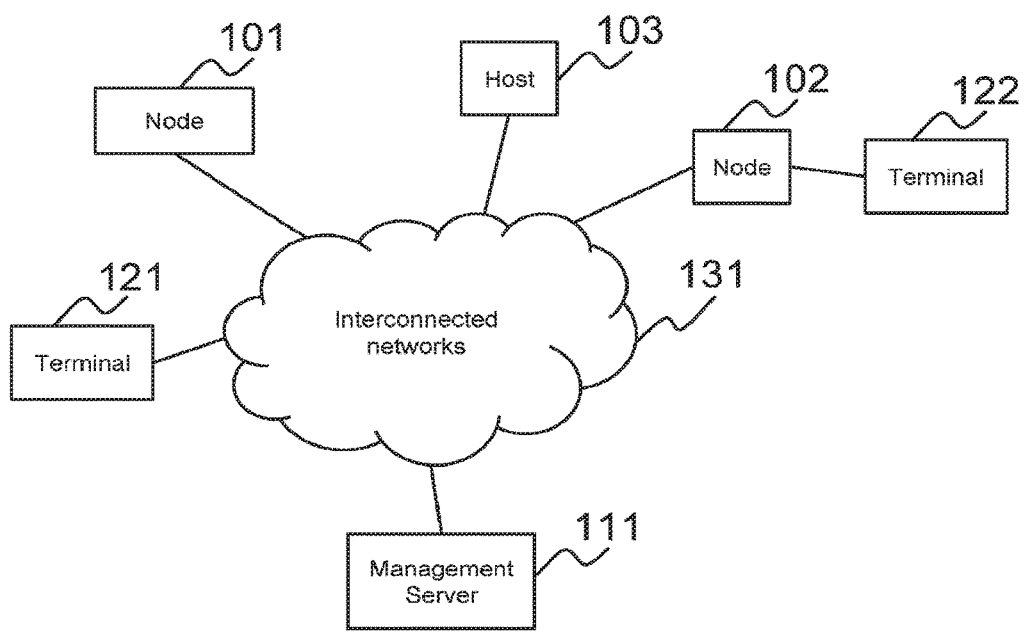
FIG. 1 illustrates a network environment according to various embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term 'storage medium' may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term 'machine-readable medium' includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, local area network (LAN), metropolitan area network (MAN), wide area network (WAN), the PSTN, a satellite communication system, a cable transmission system, and/or the like.

FIG. 1 illustrates a network environment according to various embodiments of the present invention. Nodes 101 and 102 are connected to interconnected networks 131 through one or more of their Wide Area Network (WAN) interfaces. Terminal 122 is connected to node 102 through a Local Area Network (LAN) interface of node 102. Terminal 121 connects to interconnected networks 131. Host 103 is connected to interconnected networks 131 and can connect to management server 111 through interconnected networks 131. Management server 111 also connects to interconnected networks 131. A user may access management server 111 using a terminal, such as terminals 121 and 122. A user may use terminal 121 to access management server 111 directly through interconnected networks 131. Similarly, a user may use terminal 122 to access management server 111 through node 102 and interconnected networks 131.

Host 103 can be a server, a web server, a database server, a laptop computer, a desktop computer, a mobile phone, a smart-phone, a sensor or any other electronic device that can be managed locally or remotely.

Nodes 101 and 102 may be a network device such as a router or a gateway. Alternatively node 101 and 102 may also be a host.

The present invention applies to both host and node. For easy reading, only a node is mentioned in the embodiments described herein.

A terminal, such as terminals 121 and 122, comprises a display, such as a cathode ray tube (CRT), plasma display, or a liquid crystal display (LCD), for displaying information to an administrator or user of the terminal. A terminal also comprises an input device to allow the administrator or user of the terminal to communicate information and commands to a processing unit. The terminal can be a network node, a network host, a server, a desktop, a laptop, a mobile device or any electronic device that is capable of performing the functions of a terminal. The terminal can be located in the same network of nodes or management server or can be located in a remote network.

A management server, such as management server 111, is used to manage hosts or nodes remotely. Management server 111 can be a router, a network node, a server, a desktop, a laptop, a mobile device or any electronic device that may store information related to a node and through which a node can be managed. Management server 111 can be located in the same network of nodes or terminals or can be located in a remote network.

Figure 6A:
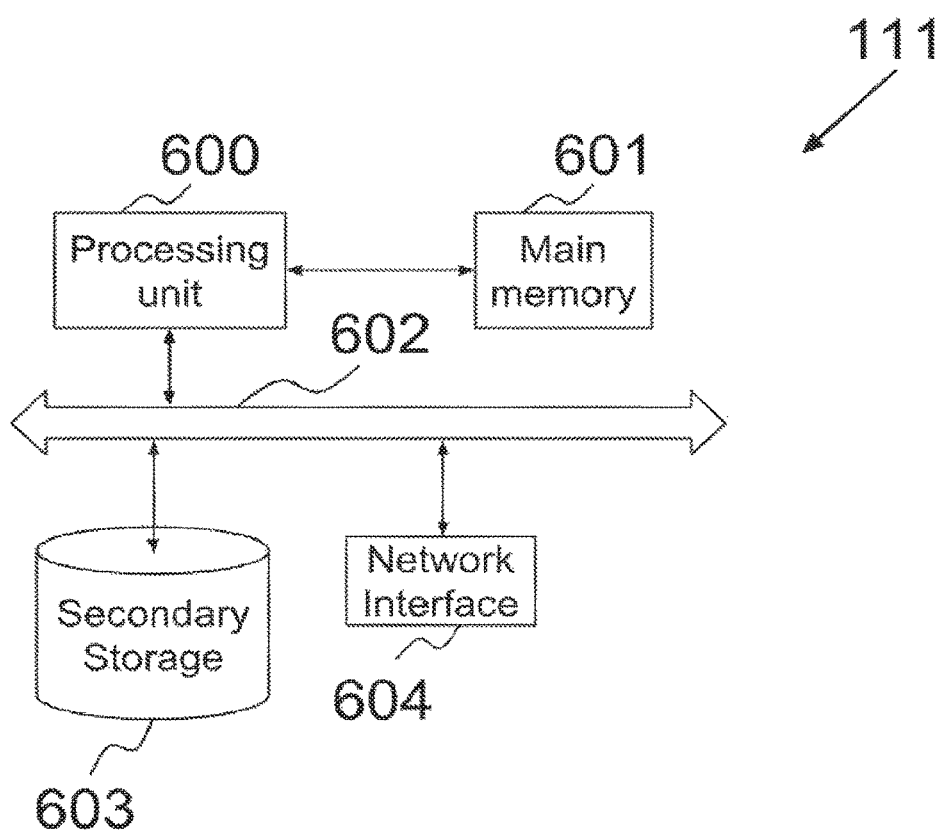
FIG. 6A is an illustrative block diagram of a management server according to one of the embodiments of the present invention.

FIG. 6A is an illustrative block diagram of a management server, such as management server 111 according to one of the embodiments of the present invention. Management server 111 comprises processing unit 600, main memory 601, system bus 602, secondary storage 603, and network interface 604. Processing unit 600 and main memory 601 are connected to each other directly. System bus 602 connects processing unit 600 directly or indirectly to secondary storage 603, and network interface 604. Using system bus 602 allows management server 111 to have increased modularity. System bus 602 couples processing unit 600 to secondary storage 603, and network interface 604. System bus 602 can be any of several types of bus structures including a memory bus, a peripheral bus, and a local bus using any of a variety of bus architectures. Secondary storage 603 stores program instructions for execution by processing unit 600. The scope of the invention is not limited to management server 111 having one network interface only, such that management server 111 may have one or more network interfaces.

Figure 6B:
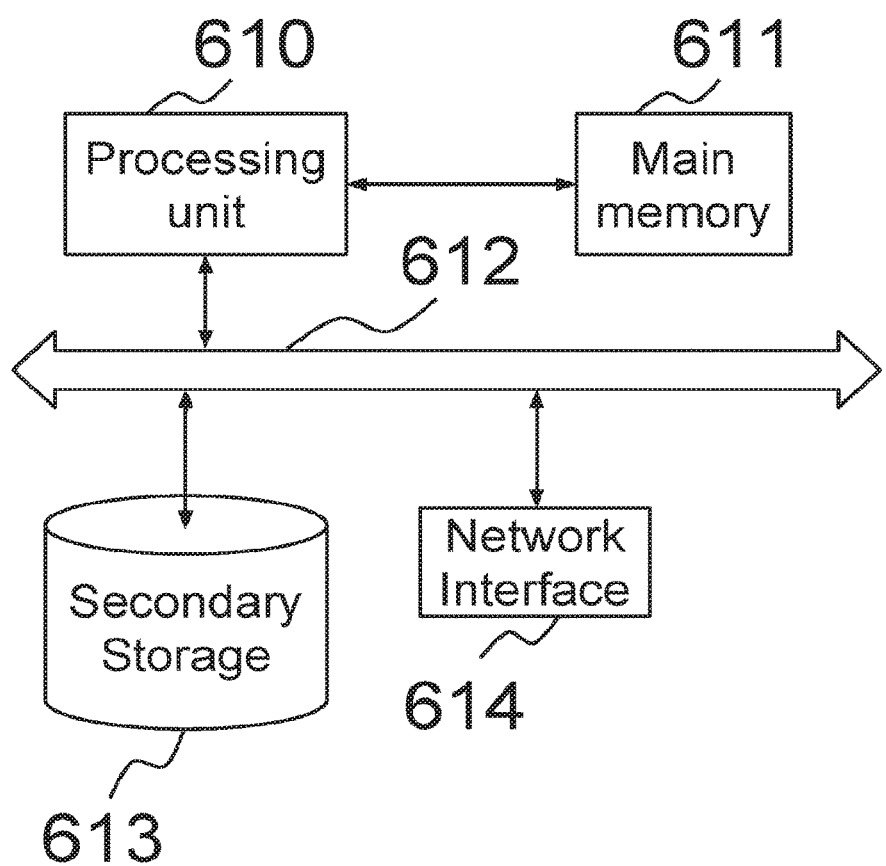
FIG. 6B is an illustrative block diagram of a node according to one of the embodiments of the present invention.

FIG. 6B is an illustrative block diagram of a node, such as node 101 and node 102, according to one of the embodiments of the present invention. The node comprises processing unit 610, main memory 611, system bus 612, secondary storage 613, and network interface 614. Processing unit 610 and main memory 611 are connected to each other directly. System bus 612 connects processing unit 610 directly or indirectly to secondary storage 613, and network interface 614. Using system bus 612 allows the node to have increased modularity. System bus 612 couples processing unit 610 to secondary storage 613, and network interface 614. System bus 612 can be any of several types of bus structures including a memory bus, a peripheral bus, and a local bus using any of a variety of bus architectures. Secondary storage 613 stores program instructions for execution by processing unit 610. The scope of the invention is not limited to the node having one network interface only, such that the node may have one or more network interfaces.

Figure 2A:
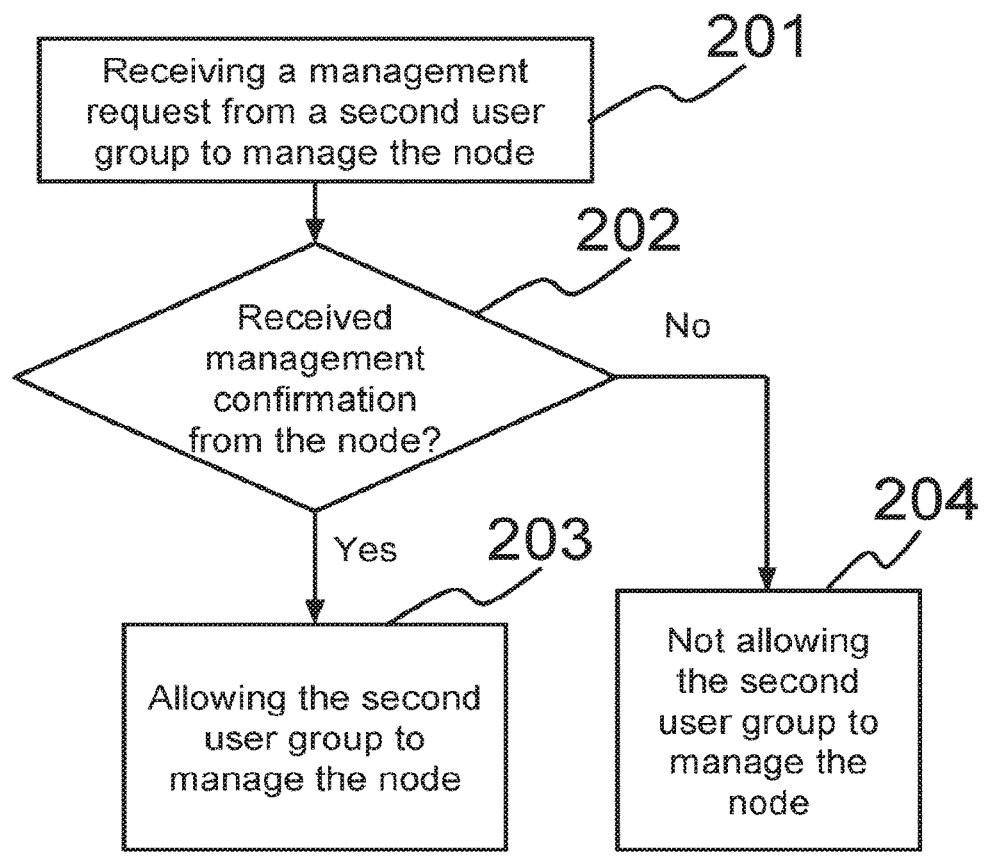
FIG. 2A is a flowchart illustrating a process according to one of the embodiments of the present invention.

FIG. 2A is a flowchart illustrating a process according to one of the embodiments of the present invention. The process of FIG. 2A may be carried out at management server 111 by processing unit 600. Management server 111 receives a management request for managing a node, such as node 101 or node 102, from one or more users belonging to a second user group in step 201. For illustration purpose, the context in which the process of FIG. 2A is carried out may be that a first user group has already been allowed to manage node 102 through management server 111. For example, the management request is for managing node 102. Management server 111 sends a confirmation request to node 102 in order to inform node 102 that a management request was received from the second user group. In step 202, management server 111 determines whether a management confirmation has been received from node 102 to allow the second user group to manage node 102 through management server 111. If management server 111 receives a management confirmation from node 102, management server 111 allows the second user group to manage node 102 in step 203. Alternatively, when management server 111 does not receive a management confirmation from node 102, it does not allow the second user group to manage node 102 through management server 111 in step 204.

When the second user group is allowed to manage node 102 through management server 111, management server 111 may update its record of users or user groups that are allowed to manage node 102 through management server 111. The record is updated such that if another management request is received from the second user group after performing step 203, management server 111 looks up the record and determines to allow the second user group to manage node 102 through management server 111. Management server 111 does not need to wait for a management confirmation from node 102 in order to allow the second user group to manage node 102 when the another management request is received.

In one variant, when the second user group is not allowed to manage node 102 through management server 111 in step 204, management server 111 may update its record of users or user groups that are not allowed to manage node 102 through management server 111. The record is updated such that if another management request is received from the second user group after performing step 204, management server 111 looks up the record and determines to not allow the second user group to manage node 102. Management server 111 does not need to inform node 102 that the another management request is received from the second user group.

Alternatively, when the second user group is not allowed to manage node 102 through management server 111 in step 204, and another management request is received from the second user group after performing step 204, management server 111 performs the process of FIG. 2A again with the another management request.

In one variant, management server 111 determines whether the management confirmation has been received within a predefined time period after receiving the management request in step 201. If the management confirmation has been received within the predefined time period, the second user group is allowed to manage the node through management server 111 in step 203. If the management confirmation has not been received within the predefined time period, the second user group is not allowed to manage the node through management server 111 in step 204. In one variant, if the management confirmation is not received within the predefined time period, management server 111 sends the confirmation request to node 102 again and waits for a management confirmation from node 102.

The predefined time period may be configured by an administrator of node 102 or management server 111. Those skilled in the arts would know that a predefined time period may be set for security purposes, so that node 102 has a limited time to send the management confirmation.

An administrator of a node is a person who has the authority to configure the node and monitor the activities of the node. The administrator can use a username and password for logging in to an administration user interface (AUI) of the node and configure the node and/or monitor the activities of the node. For example, the AUI may be accessible through the LAN interface of the node, or the WAN interface of the node. The AUI can also be accessible by coupling an interface of a terminal to the node through a physical medium such as a serial port, a console or a USB port, or mediums such as NFC, bluetooth, infrared, etc. In one example, an administrator can also be a user who manages a node through management server 111. In one variant, the AUI may be displayed at a terminal, such as terminal 121 or 122. For example, the AUI of node 102 may be accessible through the LAN interface of node 102 and displayed at terminal 122. In another example, the AUI of node 101 may be accessible through the WAN interface of node 101 and displayed a terminal 121.

A user is a person who is authorized to access management server 111. The user may access management server 111 by logging in to management server 111 at a terminal, such as terminal 121 or 122. For example, a user may have a login username and password for logging in a management user interface (MSUI) corresponding to management server 111. Even when a user is authorized to access management server 111, the user may or may not be allowed to manage a particular node through management server 111.

A first user group may comprise one or more first users. For illustration purpose, and easy understanding, a first user group comprises at least one first user that has already been allowed to manage a node through management server 111. A second user group may comprise one or more second users. A second user belonging to the second user group may send a management request to management server 111 for managing a node while the first user group is already allowed to manage the node through management server 111.

Furthermore, one or more users may belong to a user group. The one or more users can log in to management server 111 by using group information such as a first group ID and password. Alternatively, the one or more users may log in to management server 111 using a group code which is common to all users of a particular group. In addition to group information, user may also need to enter their individual information such as a username.

In one example, a user may send a management request to management server 111 for managing node 102 by entering the serial number of node 102 at the MSUI corresponding to management server 111. The user may access the MSUI at a terminal, such as terminal 121.

Alternatively, the user may also send the management request for managing node 102 by entering a random number, a QR code, or any other identification corresponding to node 102.

When a user logs in to management server 111, the user can see the details of nodes that the user is allowed to manage through management server 111. The user can manage the nodes through management server 111 at the MSUI. The MSUI may be a web page, a LCD display, an audio user interface, a video user interface, a motion sensing user interface, or any other user interface that can be used by the user to manage the node through management server 111.

Figure 2B:
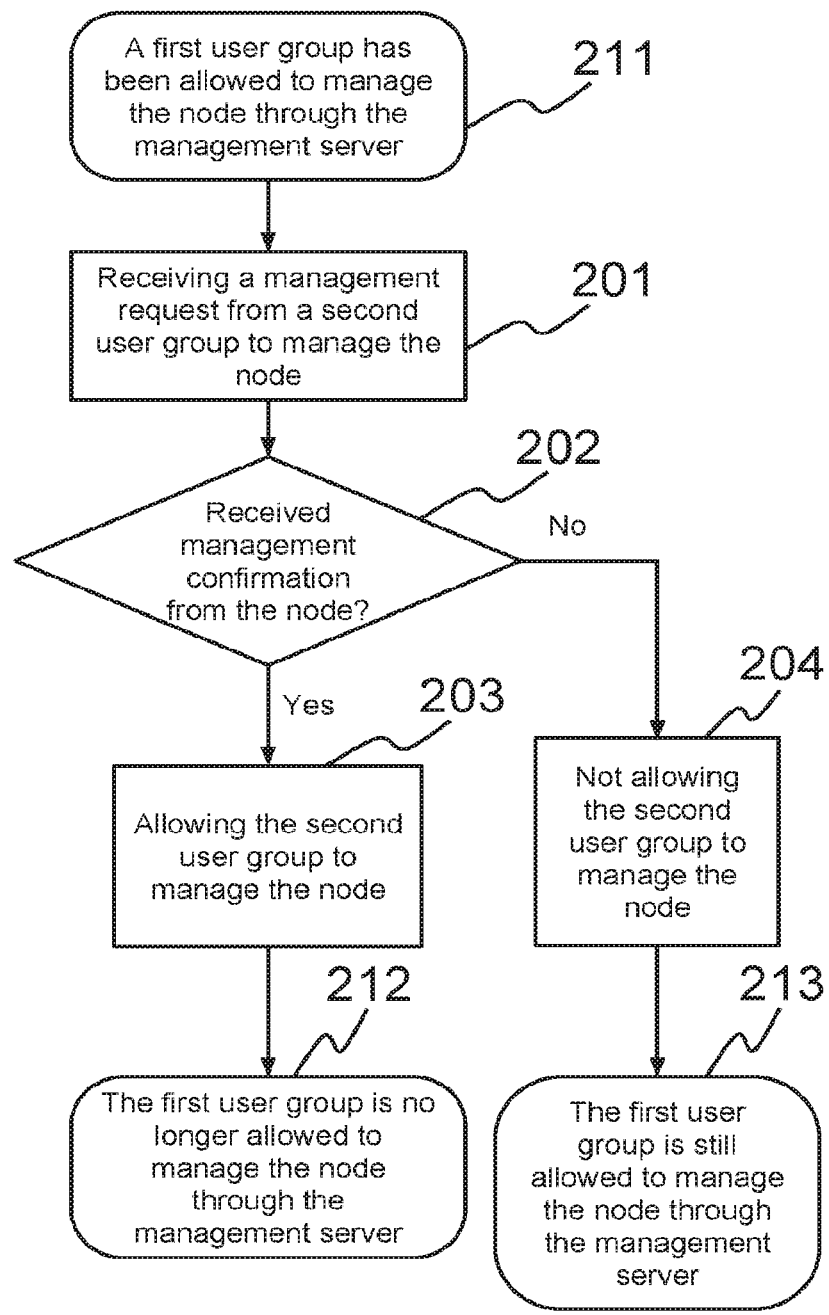
FIG. 2B is a flowchart illustrating a process according to one of the embodiments of the present invention.

FIG. 2B is a flowchart illustrating a process according to one of the embodiments of the present invention. In one of the embodiments, as illustrated in FIG. 2B, a first user group has been allowed to manage a node through management server 111 in step 211. Therefore, one or more first users belonging to the first user group can manage the node through management server 111. A management request from a second user group for managing the node through management server 111 is received in step 201 while the first user group is already allowed to manage the node. If a management confirmation is received from the node in step 202, management server 111 allows the second user group to manage the node in step 203. Therefore, the second user group becomes being allowed to manage the node and the first user group is no longer allowed to manage the node through management server 111 in step 212. Alternatively, if a management confirmation was not received from the node, the second user group is not allowed to manage the node in step 204 and the first user group is still allowed to manage the node through management server 111 in step 213.

According to one of the embodiments of the present invention, the management confirmation may be encrypted by the node.

An AUI is used by an administrator to configure the node and monitor the activities of the node. An AUI can be a web page, a LCD display, an audio user interface, a video user interface, a motion sensing user interface, or any other user interface that can be used by the administrator to monitor and configure the node.

Figure 5A:
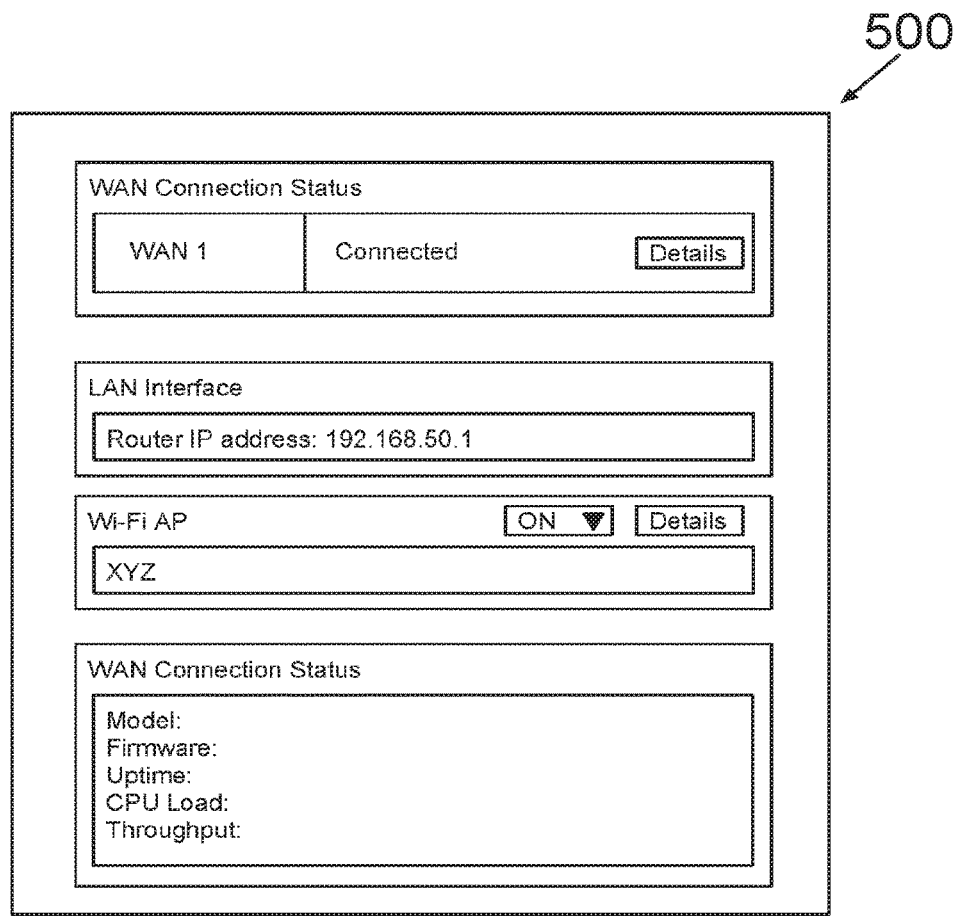
FIG. 5A illustrates an administration user interface of a node according to one of the embodiments of the present invention.

FIG. 5A illustrates an AUI of a node, such as node 102, according to one of the embodiments of the present invention. AUI 500 displays information corresponding to node 102 such as the status of WAN interface, LAN interface, and Wi-Fi AP, and also the model, firmware, uptime, and throughput.

Figure 3A:
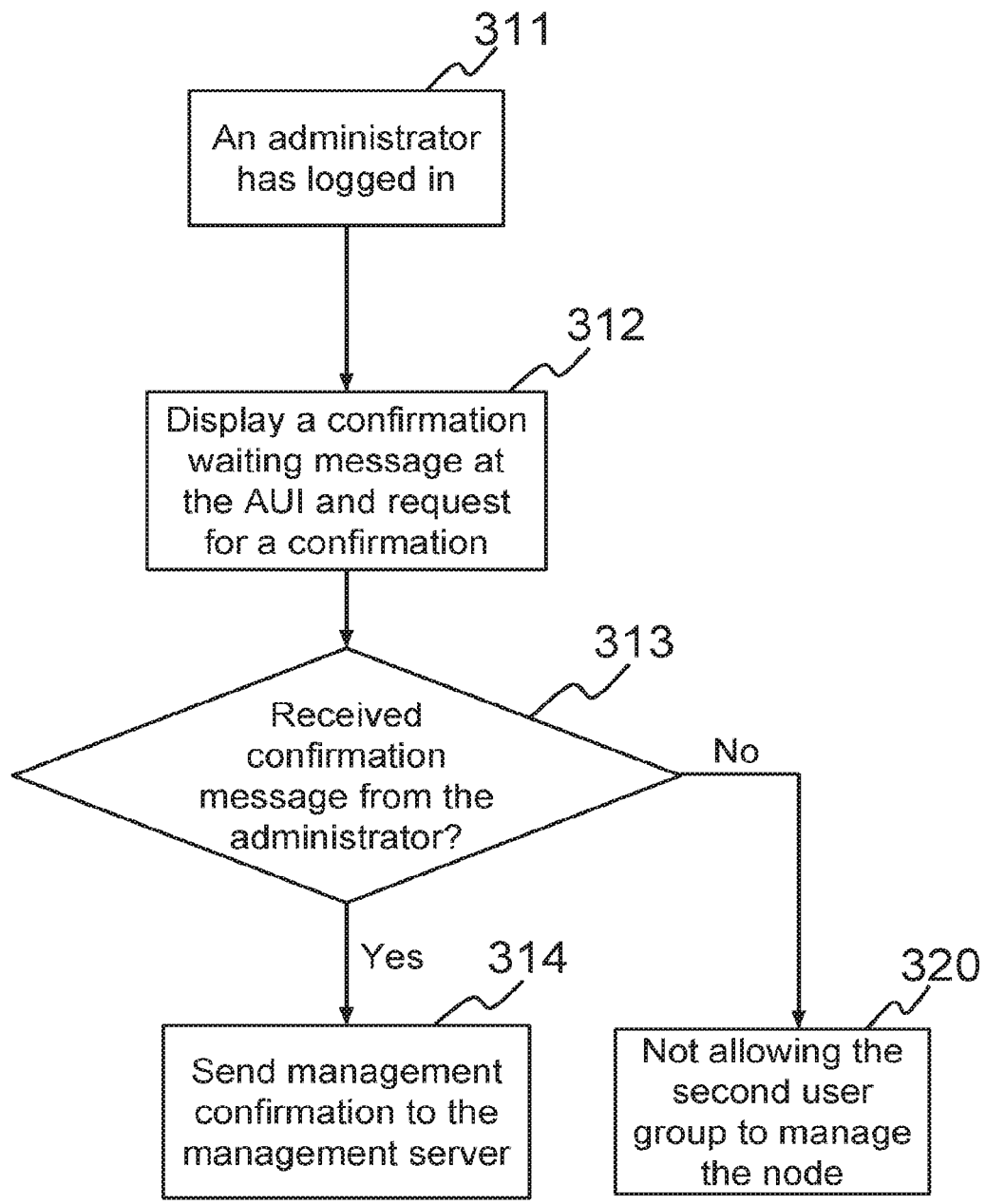
FIG. 3A is a flowchart illustrating a process according to one of the embodiments of the present invention.

FIG. 3A is a flowchart illustrating a process according to one of the embodiments of the present invention. When a second user group sends a management request to management server 111 for managing node 102, management server 111 sends a confirmation request to node 102 in order to receive a management confirmation from node 102 for allowing the second user group to manage node 102. After an administrator has logged in to an AUI of node 102 in step 311, node 102 displays a confirmation waiting message on an AUI of node 102 at the terminal used by the administrator in step 312. In step 313, node 102 determines whether a confirmation message is received from the administrator. If a confirmation message is received from the administrator, node 102 sends the management confirmation to management server 111 in step 314. Alternatively, if a confirmation message is not received from the administrator, node 102 does not send the management confirmation to management server 111, and thus, management server 111 does not allow the second user group to manage node 102. For example, the administrator may refuse or ignore the management request, and thus the second user group is not allowed to manage node 102.

Figure 5B:
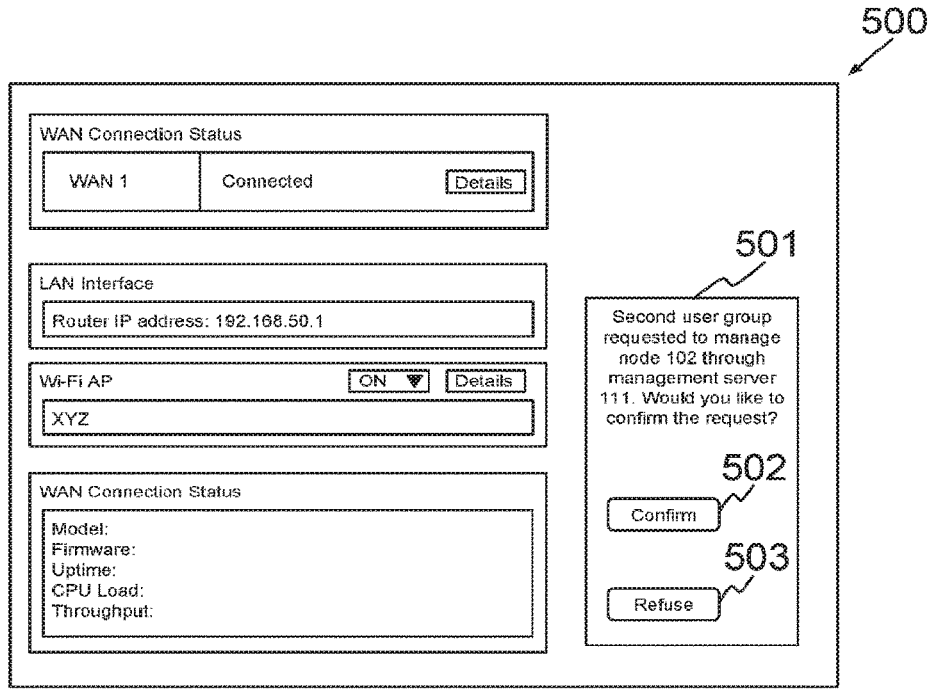
FIG. 5B illustrates the administration user interface of a node according to one of the embodiments of the present invention.

According to one of the embodiments, viewing in conjunction with FIG. 5B, confirmation waiting message 501 is displayed in AUI 500 at step 312 when a second user group requests to manage node 102 through management server 111. The administrator can send the confirmation message to node 102 through AUI 500. For illustration purpose, confirmation waiting message 501 can be a pop-up message with a 'confirm' button 502. The administrator can then click 'confirm' button 502 for sending a confirmation message to node 102 that allows the second user group to manage node 102 through management server 111. The administrator can otherwise click 'refuse' button 503, such that the confirmation message is not sent to node 102, and the second user group is not allowed to manage the node in step 320.

Figure 5C:
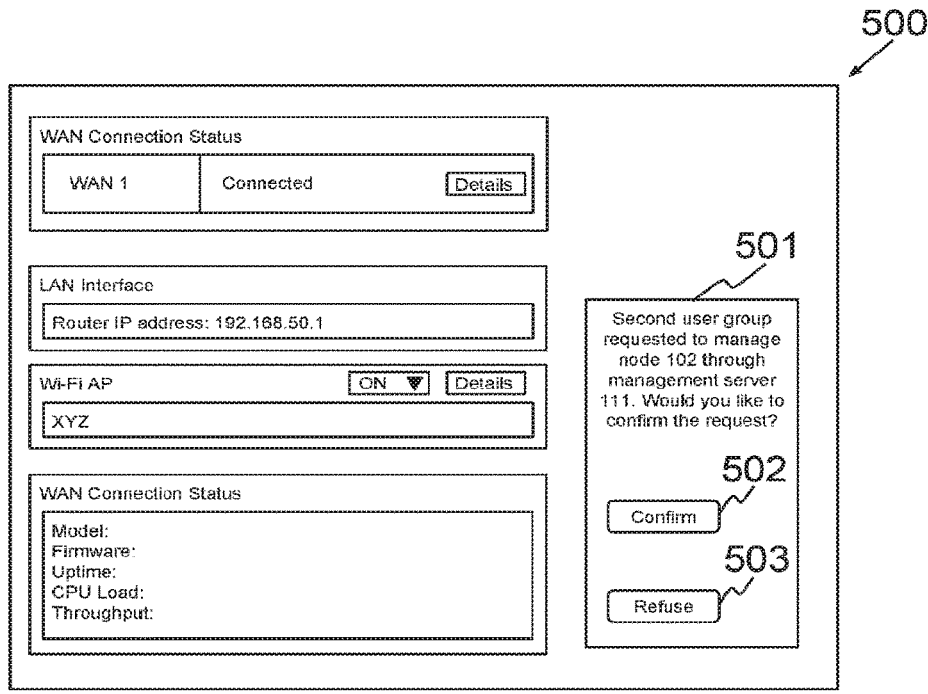
FIG. 5C illustrates the administration user interface of a node according to one of the embodiments of the present invention.

In one variant, as illustrated in FIG. 5C, the confirmation waiting message comprises 'ignore' button 504 in addition to 'refuse' button 503. When the administrator clicks 'ignore' button 504, confirmation waiting message 501 is no longer displayed at AUI 500. The administrator may be able to view confirmation waiting message 501 later and decide whether to confirm allowing the second user group to manage node 102. Alternatively, if the administrator clicks 'refuse' button 503, the management request of the second user group to manage node 102 is refused and management server 111 does not allow the second user group to manage node 102 through management server 111. The administrator will not be able to view confirmation waiting message 501 later, as the management request has already been refused. Alternatively, if the administrator clicks 'confirm' button 502, the second user group is allowed to manage node 102 through management server 111. The administrator will not be able to view confirmation waiting message 501 later, as the management request has already been confirmed.

Alternatively, the administrator can send the confirmation message to node 102 through a web interface, application programming interface (API), command line interface, console, Bluetooth, or USB, depending on how the terminal is connected to node 102. Node 102 receives the confirmation message from the administrator in step 313 when the administrator sends the confirmation message to node 102.

For example, the administrator of node 102 logs in to an AUI of node 102 using terminal 122. Terminal 122 is connected to the LAN interface of node 102 through an Ethernet cable. Terminal 122 can access the AUI of node 102 using the LAN interface IP address of node 102.

In another example, the AUI of node 102 can be accessed using the WAN interface IP address of node 102. The administrator may use terminal 121 or terminal 122 for accessing the AUI through the WAN interface of node 102.

In another example, terminal 122 directly accesses node 102 through a USB port, Bluetooth, serial port, infrared, console, or the like. Direct access increases security requirement for accessing or connecting to node 102, since terminal 122 has to be physically placed in close proximity to node 102. By controlling who can be in close proximity to node 102, owner or the administrator of node 102 has another security requirement. The administrator may access the AUI using terminal 122 which is connected to node 102.

According to one of the embodiments of the present invention, the administrator may be required to perform an additional authentication step in order to log in to the AUI of node 102. For example, the administrator first needs to access the AUI through a LAN interface of node 102, and enter a username and password. The administrator may then need to perform the additional authentication step by entering a security code generated by an authentication device. The authentication device may be a device given with a node when the node is purchased, and is used to increase the security of the node, such that only authorized persons can access the AUI of the node. The authentication device may generate a security code, such as a random number corresponding to the node whenever it receives a request for the security code.

According to one of the embodiments of the present invention, the authentication may be performed by an authentication, authorization, and accounting (AAA) server with which the node connects using a Remote Authentication Dial In User Service (RADIUS) system.

According to one of the embodiments of the present invention, a user who is allowed to manage node 102 through management server 111, may view AUI 500 of node 102 through management server 111 at the MSUI. When the AUI 500 is viewed through management server 111, confirmation waiting message 501 is not displayed at AUI 500. For example, when a first user group is already allowed to manage node 102 through management server 111, the first user group may view AUI 500 through management server 111, while an administrator may also view AUI 500 through node 102 at a terminal. When a second user group requests to manage node 102, the administrator can view confirmation waiting message 501 at AUI 500, but the first user group cannot view confirmation waiting message 501 at AUI 500 because the first user group views AUI 500 through management server 111. Confirmation waiting message 501 is not displayed to the first user group because a management request can be confirmed or refused only when AUI 500 is accessed directly through node 102. Those skilled in the art would appreciate that a user or user group who has been previously allowed to manage node 102 through management server 111 should not have the authority to make the decision whether a new user or user group should be allowed to manage node 102 or not.

Figure 3B:
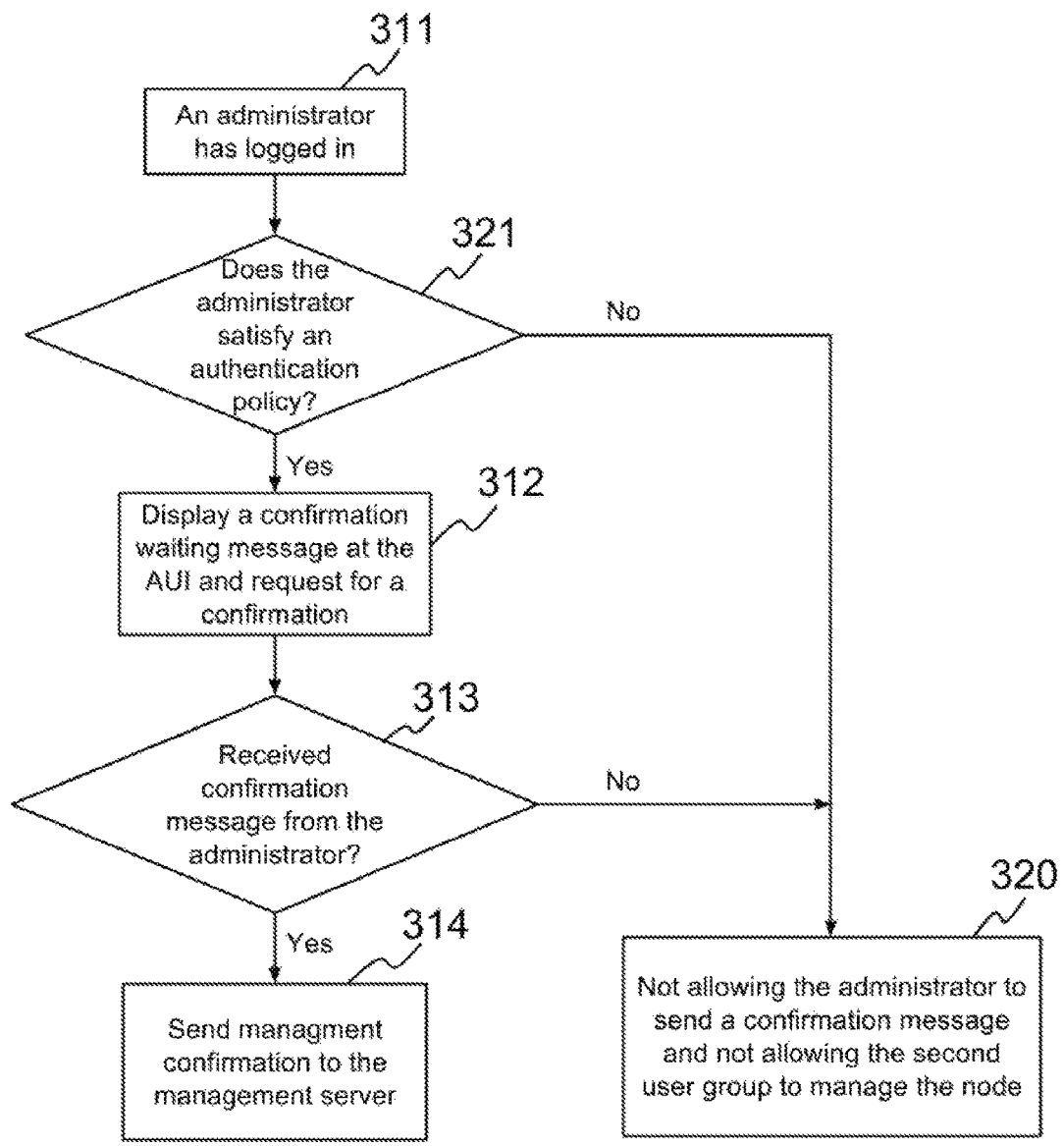
FIG. 3B is a flowchart illustrating a process according to one of the embodiments of the present invention.

FIG. 3B is a flowchart illustrating a process according to one of the embodiments of the present invention. FIG. 3B is viewed in conjunction with FIG. 3A for better understanding of the embodiments. After the administrator logs in to AUI 500 of node 102 in step 311, node 102 verifies the administrator's identity by determining whether the administrator satisfies an authentication policy in step 321. If the administrator satisfies the authentication policy, confirmation waiting message 501 is displayed at AUI 500 in step 312 and a confirmation is requested. The administrator is then able to send a confirmation message to node 102. Alternatively, if the administrator does not satisfy the authentication policy, the administrator is able to see that a management request has been sent by the second user group, but the administrator is not able to send a confirmation message to node 102 for allowing a second user group to manage node 102 through management server 111. Thus the second user group is not allowed to manage the node through management server 111 in step 320.

In one variant, if the administrator does not satisfy the authentication policy, the confirmation waiting message is not displayed at the AUI of node 102. Therefore the administrator is not able to send a confirmation message to node 102, and the second user group is not allowed to manage the node in step 302.

The authentication policy may be selected from a group consisting of entering a security code, entering a QR code, being coupled to the node with a cable or wire, being connected to the node through a secured tunnel, being connected to the node through a LAN interface, and having a digital certificate.

Figure 4A:
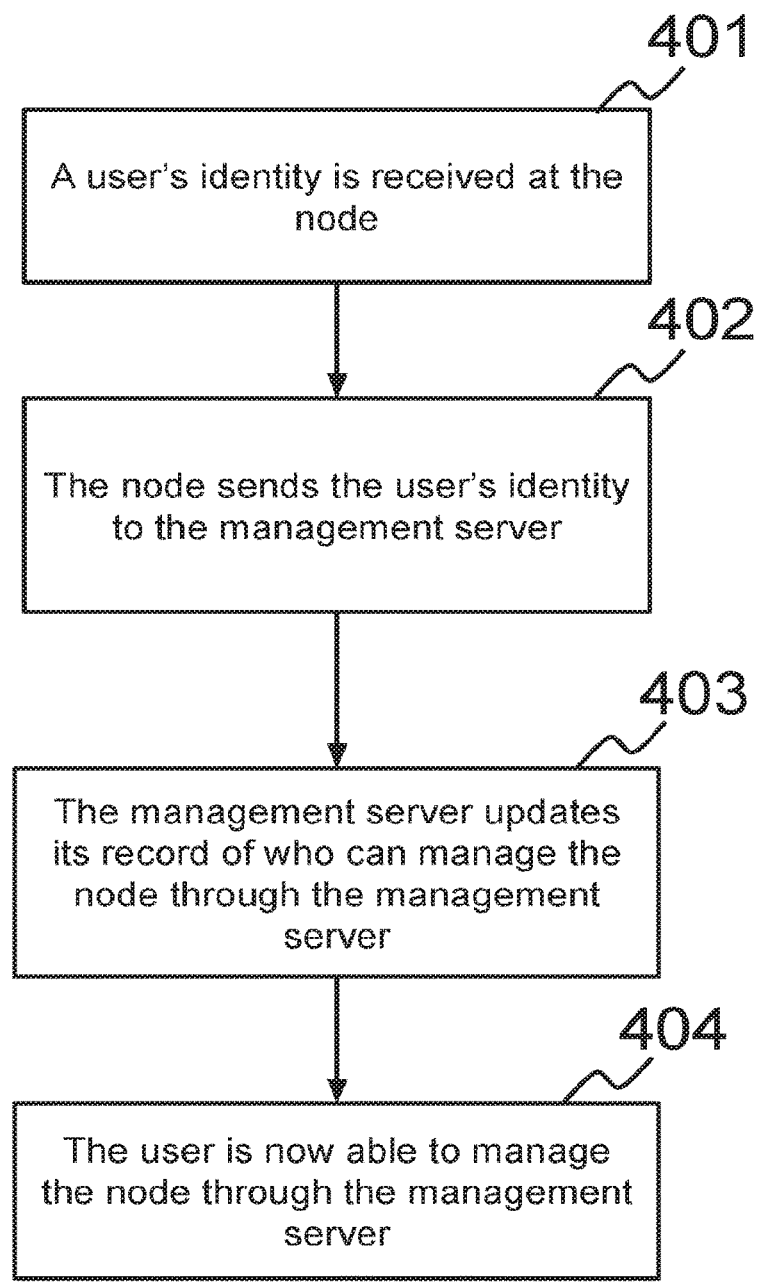
FIG. 4A is a flowchart illustrating a process according to one of the embodiments of the present invention.

FIG. 4A is a flowchart illustrating a process according to one of the embodiments of the present invention. User identity information is received at a node, such as node 102, at step 401. For example, the user identity information may be a user's identity. When a user's identity is received in step 401 at node 102, node 102 sends the user's identity to management server 111 in step 402. Management server 111 updates records corresponding to the user of node 102 in step 403 according to the user's identity. The records that are updated are used by management server 111 to identify who should be allowed to manage node 102 through management server 111. Therefore, the user is then allowed to manage node 102 through management server 111 in step 404 when the user sends the management request to manage node 102 with the user's identity sent by node 102.

The process of FIG. 4A is to ensure that a person who requests to manage node 102 is authenticated as the user before allowing the person to manage node 102 through management server 111. The user's identity and authentication information can be entered at the AUI of node 102.

In one variant, the user's identity and authentication information can also be modified at the AUI of node 102. When the user's identity is modified, the modification is received at node 102 in step 401. The process of FIG. 4A is then carried out so that management server 111 updates its records corresponding to the user according to the modification.

The user's identity may be a username corresponding to the user. Alternatively, the user's identity may be the IP address of a user that should be allowed to manage node 102 through management server 111. Alternatively, the user's identity may be the Media Access Control (MAC) address of a user that should be allowed to manage node 102 through management server 111. In one variant, when the user's identity is the IP address or MAC address, the user may not need to enter an authentication information.

In one variant, a user group consisting of at least one user is authenticated and allowed to manage node 102. At step 401, the user's identity and authentication information received may be used to authenticate the user group. The at least one user may use the same user's identity and authentication information for being allowed to manage node 102 through management server 111. Alternatively, in step 401 the administrator may enter information of a user group identity, at least one user identity corresponding to the at least one user, and authentication information corresponding to each of the at least one user. The information entered by the administrator is sent to management server 111 at step 402, and management server 111 updates its record according to the information in step 403 to identify the at least one users who should be allowed to manage node 102 through management server 111. The at least one users are then allowed to manage node 102 through management server 111 in step 404 when they send a request comprising the user group identity, their corresponding at least one user identity, and their corresponding authentication information.

In one of the embodiments of the present invention, a user's identity, which is the identity of a user who can be allowed to manage node 102, is entered by the administrator at an AUI. The authentication information of the user is also entered by the administrator at the AUI. Management server 111 must have the user's identity and authentication information, so that it can decide whether a person should be allowed to manage node 102 based on the user's identity and authentication information. This makes sure that only a person who is authenticated as the user is allowed to manage node 102 through management server 111.

For example, the authentication information sent by node 102 to management server 111 may include a hashed password. Management server 111 compares the hashed password sent by node 102 and a hashed password received from the MSUI when the user provides a password. The authentication information may also include a digital certificate, such that the user has to use a digital certificate in order to be authenticated as the user by management server 111.

Figure 4B:
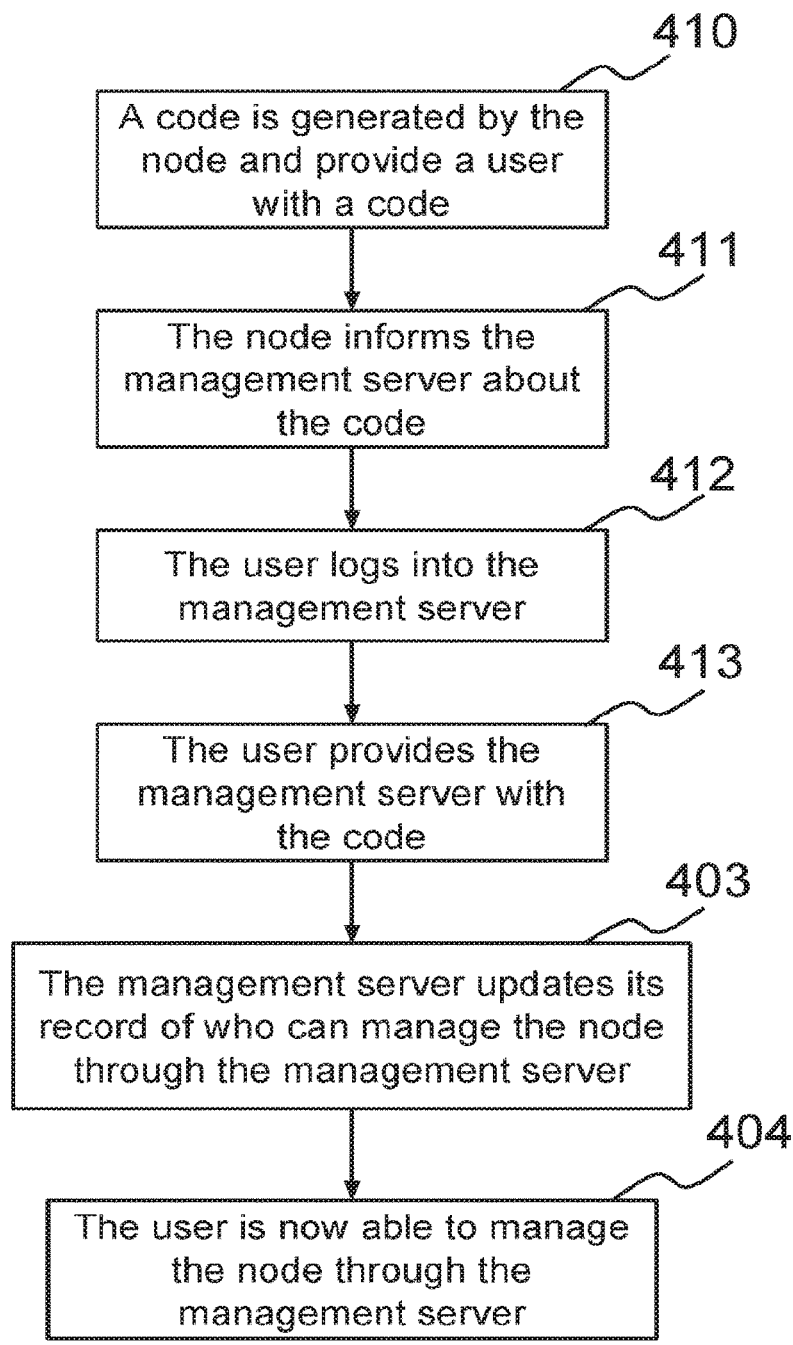
FIG. 4B is a flowchart illustrating a process according to one of the embodiments of the present invention.

FIG. 4B is a flowchart illustrating a process according to one of the embodiments of the present invention. In step 410, a code is generated by a node, such as node 102, and provided to a user. Node 102 then sends the code to management server 111 in step 411, as management server 111 needs the code in order to authenticate a person who requests to manage node 102 through management server 111. In step 412, the user logs in to management server 111 with a username and password. The user may belong to a user group. The user then provides management server 111 with the code in step 413 through the MSUI. Management server 111 has to compare the code provided by the user in step 413 and the code sent by node 102 in step 411. If the codes are the same, the user is authenticated and management server 111 updates records for node 102 corresponding to the user in step 403. Therefore, management server 111 updates records of who is allowed to manage node 102 through management server 111. The administrator may then manage node 102 through management server 111 in step 404. This ensures that only the user is allowed to manage node 102 through management server 111.

In one variant, a user group is provided with the code in step 410. The user group consists of at least one user. Therefore, each of the at least one user is authenticated if the code is provided in step 413 and the code matches the one sent to management server 111 from node 102 in step 411. The user group is then allowed to manage node 102 through management server 111 in step 404.

The code may be a secret code that is only known to the user if node 102 provides the user with the code.

In step 410, the code can be provided to the user by various means such as email, instant message (IM), Short Message Service (SMS) message, pop-up message at the AUI, etc. In one variant, the code may be hashed and stored by management server 111. Node 102 sends a hashed code to management server 111 in step 410. When the user provides the code, the code is first hashed and then sent to management server 111. Management server 111 then compares the hashed codes in order to determine whether the user should be authenticated and allowed to manage node 102.

According to one of the embodiments of the present invention, when a user is allowed to manage a node, the user is capable of managing or monitoring activities of the node at the MSUI. For example, the user may monitor the geographical location of the node, the list of clients connected to the node, the list of Virtual Private Network (VPN) connections established with the node, statistical reports of the node, and usage information at the MSUI. The user may also change configuration of the node at the MSUI. For example, a the node may be configured with a firmware through management server 111 by the user.

The list of clients connected to the node may include hosts connected to a Local Area Network (LAN) interface. If the node acts as a Wi-Fi access point (AP), the list of clients include hosts connected to Wi-Fi network. The user may also configure Service Set Identifier (SSID) of a Wi-Fi network associated with the node.

The list of VPN connections may include information of remote node(s) with which one or more VPN connections have been established. Information about the VPN connections, such as authentication information, tunnel information, etc, may also be included. When more than one VPN connections are established with a remote node, the more than one VPN connections may be combined or bonded to form an aggregated VPN connection. Additionally, the user may also configure the node through management server 111 to establish one or more VPN connections with a remote node. While configuring the node to established the one or more VPN connections, the user may enter authentication information, IP address of the remote node, and any other information required to establish a VPN connection.

Statistical reports of the node may include performance reports. The performance reports may be real-time, hourly, daily or monthly performance reports. The performance reports may include information such as bandwidth, packet drop or loss rate, noise, latency, round-trip time (RTT), packet jitter, system performance, etc. The statistical reports of the node may further include client information, such as the time periods at which the clients were connected to the node, the manufacturers of the clients, the bandwidth used by each client, frequency of the clients connecting to the node, etc.

Those skilled in the arts would appreciate that the above embodiments which have been described with reference to node 102, may also be applicable to node 101 or host 103. The processes described above may be carried out for managing node 101 or host 103 through management server 111.

The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for allowing a user to manage a network node through a management server, comprising:
   (a) at the network node, receiving an user's identity and authentication information from an administrator;
   (b) at the network node, sending the user's identity and authentication information from the network node to the management server;
   (c) at the management server, updating a record of users according to the users' identities and authentication information; and
   (d) at the management server, allowing the user to manage the network node through the management server; wherein the user is allowed to manage when a management request is received from the user at a management user interface (MSUI) with the same user's identity and authentication information as the user's identity and authentication information sent by the network node.

2. The method of claim 1, wherein the user's identity comprises one of, a username, an IP address, and a MAC address.

3. The method of claim 1, wherein the user's identity and authentication information is received through an administration user interface.

4. The method of claim 3, wherein the administration user interface is configured to be displayed at a terminal.

5. The method of claim 4, wherein the administration user interface is accessible only when the terminal is at a close proximity to the network node.

6. The method of claim 3, wherein the administration user interface is accessible through a wireless communication technology.

7. The method of claim 3, further comprising, receiving a confirmation from an administrator of the network node, and wherein steps (c) and (d) are not performed unless the confirmation is received.

8. The method of claim 7, wherein the administrator is a member of a first user group and the user is a member of a second user group.

9. A method for allowing a user to manage a network node through a management server, comprising, at the management server:
(a) receiving an user's identity and authentication information and a code from the network node; wherein the code is generated by the network node;
(b) receiving a management request from the user at a management user interface; wherein the management request comprises the user's identity and authentication information and a code;
(c) authenticating the user according to the user's identity and authentication information and the code; wherein the user is authenticated when the user's identity and authentication information and the code match with the user's identity and authentication information and the code received from the network node;
when the user information is authenticated:
(d) updating the record at the management server according to the user's identity and authentication information; and
(e) allowing the user to manage the network node through the management server.

10. The method of claim 9, wherein the code is provided to the user's terminal only when the user's terminal is at a close proximity to the network node.

11. A system for allowing a user to manage a network node, the system including:
a management server; and
a network node;
wherein the network node comprises:
at least one first network interface;
at least one first main memory;
at least one first processing unit; and
at least one first secondary non-transitory computer readable storage medium for storing program instructions executable by the at least one first processing unit for:
(a) receiving an user's identity and authentication information from an administrator;
(b) generating a code;
(c) sending the user's identity and authentication information and the code to the management server;
wherein the management server comprises:
at least one second network interface;
at least one second main memory;
at least one second processing unit;
at least one second secondary non-transitory computer readable storage medium for storing program instructions executable by the at least one second processing unit for the steps of:
(d) receiving a management request from the user at a management user interface; wherein the management request comprises the user's identity and authentication information and a code;
(e) authenticating the user according to the user's identity and authentication information and the code; wherein the user is authenticated when the user's identity and authentication information and the code match with the user's identity and authentication information and the code received from the network node;
(f) when the user information is authenticated:
(i) updating record at the management server according to the user's identity and authentication information; and
(ii) allowing the user to manage the network host through the management server.

12. The system of claim 11, wherein the user's identity comprises one of, an username, an IP address, and a MAC address.

13. The system of claim 11, wherein the user's identity and authentication information is received through an administration user interface.

14. The system of claim 13, wherein the administration user interface is configured to be displayed at a terminal.

15. The system of claim 14, wherein the administration user interface is accessible only when the terminal is at a close proximity to the network node.

16. The system of claim 13, wherein the administration user interface is accessible through a wireless communication technology.

17. The system of claim 13, further comprising at least one second processing unit to execute program instructions stored in the at least one second secondary non-transitory computer readable storage medium for receiving a confirmation from an administrator of the network node, and wherein steps (c), and (d) are not performed unless the confirmation is received.

18. The system of claim 17, wherein the administrator is a member of a first user group and the user is a member of a second user group.

* * * * *